United States Patent Office 2,921,059
Patented Jan. 12, 1960

2,921,059

HIGH DENSITY POLYETHYLENE MANUFACTURE AT HIGH PRESSURE WITH PARAFFINIC HYDROCARBON DILUENT

James E. Guillet and Harry W. Coover, Jr., Kingsport, Tenn., assignors to Eastman Kodak Company, Rochester, N.Y., a corporation of New Jersey No Drawing. Application June 12, 1956
Serial No. 590,810

10 Claims. (Cl. 260—94.9)

This invention relates to the manufacture of polyethylene and is particularly concerned with a high pressure polymerization process as described hereinafter whereby polyethylene having high density, high stiffness and high heat distortion temperatures not attained heretofore in high pressure processes is readily produced.

The commercial polyethylene produced and sold in increasing quantities in recent years has all been made by the so-called high pressure process using pressures in excess of 200 atmospheres and usually of the order of 500–1500 atmospheres as described by Fawcett et al. in U.S. 2,153,533. Various modifications have been introduced but the basic process has still been that of Fawcett et al. whereby solid polyethylene is produced having a density of 0.91–0.92, a tensile strength at yield of 1100–1600 p.s.i., an elongation of 300–600 percent, a stiffness of 10,000–15,000 p.s.i., an average molecular weight of 15,000–40,000 and a heat distortion temperature of 100–110° C. Such a material has found widespread use in the manufacture of flexible films for packaging etc. and in flexible molded articles.

More recently, certain low pressure catalytic processes have been found which will give polyethylene of higher density and greater stiffness and strength which made the fabrication of rigid articles from polyethylene a possibility. Furthermore such high density polyethylene exhibited an increase in its heat distortion temperature whereby it was not adversely affected by boiling water. Such improved polyethylene, however, necessitates the use of different equipment, conditions, etc. and it has been an unfulfilled objective heretofore to achieve such improved properties using essentially the high pressure process which has already been developed into a large scale commercial manufacture.

It is accordingly an object of this invention to provide an improved high pressure process whereby polyethylene can be readily obtained having greatly improved density, stiffness, tensile and heat distortion temperature characteristics.

Another object of the invention is to provide a modified process whereby greatly improved polyethylene can be obtained using the apparatus and techniques already in commercial practice for large scale production of lower density polyethylene.

Another object of the invention is to provide a combination of reactants, reaction conditions and reaction influencing substances which give results in a high pressure process quite different than those achieved heretofore in high pressure ethylene polymerization.

Other objects will be apparent from the description and claims which follow.

These and other objects are attained by means of this invention wherein ethylene homopolymers having an average molecular weight above 20,000, a density above 0.930, a stiffness above 25,000 p.s.i., a heat distortion temperature of at least 110° C. and an inherent viscosity in the range of 0.5 to 1.5 deciliters per gram in tetralin at 100° C. are manufactured by polymerizing ethylene at a pressure above 15,000 p.s.i. and a temperature of 80–180° C. in the presence of a non-metallic ethylene polymerization catalyst and in the presence of from 5 to 50% by weight based on the weight of the ethylene of a saturated acyclic aliphatic hydrocarbon containing 3–7 carbon atoms and in the absence of any other diluent or solvent.

Thus, in accordance with the invention a new polyethylene is obtained which differs markedly from the usual high pressure polyethylene of commerce as shown by the comparative data on typical examples in Table 1.

TABLE 1

|  | Conventional Polyethylene | New Polyethylene |
|---|---|---|
| Average Density | 0.91–0.92 | 0.93–0.955 |
| Average Mol Weight | 15,000–40,000 | 20,000–200,000 |
| Stiffness (p.s.i.) | 10,000–15,000 | 25,000–60,000 |
| Heat Distortion Temp., ° C | 100–110 | 110–130 |
| Tensile Strength (at yield, p.s.i.) | 1,100–1,600 | 2,000–3,000 |

The results obtained by the specific combination of conditions, reactants and reaction influencing substances as defined herein is particularly surprising since U.S. Patent 2,482,877 is specifically concerned with the use of saturated hydrocarbon diluents in order to give liquid polymers of ethylene and similar monoolefins when using less stringent conditions. Similarly, U.S. Patent 2,475,643 clearly shows that under the usual conditions which differ from those herein defined, solvents such as pentane give poor polyethylene. Consequently, it was surprising to find that under the conditions herein defined the hydrocarbons of the type described herein give unusually good results under the high pressure conditions and the products obtained were quite unlike those usually obtained by high pressure polymerization. Solvents have been employed in polymerization of ethylene heretofore under less stringent conditions, but usually mixtures of solvents and particularly mixtures of hydrocarbon solvents and water were employed in order to achieve any satisfactory solid polymers. In some cases, it has been possible heretofore to use certain solvents during the polymerization of ethylene by using a metallic catalyst therewith. The use of metallic or organo metallic catalysts has posed problems, however, since such catalysts are difficult to remove from the resulting polymer and their presence has led to color and stability problems.

Thus, by means of this invention, we have been able to produce by a slight modification of commercial high pressure processes, a polyethylene which is quite different than the usual low-density flexible polymer ordinarily produced by such processes and wholly different from the liquid or greasy polymers ordinarily associated with the use of aliphatic hydrocarbons. The improved process embodying the invention is carried out at pressures of at least 15,000 p.s.i. with pressures of 15,000–50,000 p.s.i being wholly operable and pressures of 15,000–30,000 p.s.i. and desirably about at least 20,000 p.s.i. being preferred. The process embodying the invention can be carried out at temperatures within the range of 80–180° C., although somewhat lower or higher temperatures can be sometimes used by varying the pressure and catalyst concentration conditions. Generally, the higher temperatures are employed with the lower pressures.

In practicing the invention, the improved results are achieved by effecting the polymerization in the presence of any of the well-known non-metallic ethylene polymerization catalysts such as the peroxy catalysts or azo catalysts which are well known in the art, together with from 5 to 50% by weight based on the weight of the ethylene of the saturated straight or branched chain aliphatic hydrocarbon having 3–7 carbon atoms in the molecule and in the absence of any other solvent or diluent. The amount of catalyst can be varied from about 5 parts per million to about 5% by weight based on the weight of the ethylene being polymerized, the preferred range being in the range of 10–100 parts per million of catalyst. Azo catalysts for ethylene polymerization are well known in the art, a large number of such catalysts being shown in U.S. 2,471,959; 2,515,628; 2,520,338; 2,520,339 and 2,565,573. Any of these or similar azo catalysts can be employed as well as any of the peroxy catalysts such as the peroxides or percarbonates and the like. The azo catalysts and the organic peroxides are preferred, although the invention resides in the combination of conditions, materials as herein defined, rather than in the nature of the particular non-metallic catalyst employed. To illustrate, such diverse azo catalysts as azobisisobutyronitrile, methyl azobisisobutyrate and diethyl 2,2'-azobis-(2-methyl propionate) are equally useful in achieving the improved results embodying the invention. Similarly, any of the organic peroxides can be used as typified by di-tert.-butyl peroxide, lauroyl peroxide, benzoyl peroxide and tert.-butyl perbenzoate.

The process embodying the invention can be effected in any of the conventional equipment for high pressure ethylene polymerization by single stage or multi-stage processes using either autoclave or elongated tubular reactor in accordance with usual practices. The pressures attained are achieved as usual by pressuring the reactor to the desired degree with ethylene, and the usual polymer recovery processes are applicable.

The invention is illustrated by the following examples which are not intended to limit the scope of the invention unless otherwise specifically indicated. In order to illustrate the fact that other well known solvents and particularly benzene which was the best known solvent for improving the characteristics of polyethylene, do not give the characteristics evident in the polymers of this invention, Example 1 has been included to illustrate the use of benzene in conventional high pressure processing. The remaining examples provide by contrast the improved results attained by means of this invention.

*Example 1*

A solution of 0.008 part by weight of 2,2'-azobis-(2-methyl propionate) in 20 parts by volume of benzene was charged into a stainless steel autoclave of 100 volumes capacity which had been purged for 3 minutes with a stream of ethylene. The reactor was then closed and pressured to 20,000 p.s.i. with ethylene and the polymerization effected at 100° C. for 2 hours. The reactor was then cooled rapidly to room temperature and vented. The polyethylene thereby obtained very closely resembled the conventional high pressure polyethylene having a relatively low softening point and a high degree of flexibility. The polymer had a viscosity of 2.08 deciliters per gram in tetralin at 100° C., a density of 0.929 and a stiffness of 20,000 p.s.i. Similar results were achieved using the organic peroxide catalyst under slightly different conditions. Thus 0.004 part by weight of di-tert.-butyl peroxide in 20 parts by volume of benzene was used to polymerize ethylene as described at 140° C. and 20,000 p.s.i. pressure. The resulting ethylene homopolymer had a viscosity of 3.13, a density of 0.921 and a stiffness of 19,000 p.s.i. Under even more stringent conditions, 0.001 part by weight of di-tert.-butyl peroxide in 20 parts by volume of benzene was used to polymerize ethylene at 180° C. and 20,000 p.s.i. pressure. The resulting polymer had an inherent index of 0.0, a density of 0.923 and a stiffness of 20,000 p.s.i. It was thus apparent that the polyethylene prepared in the presence of benzene differed only slightly from the conventional high pressure polyethylene of commerce prepared in the absence of solvent or diluent.

*Example 2*

In contrast to the results shown in the preceding example, 0.008 part by weight of diethyl 2,2'-azobis-(2-methyl propionate) in 16.0 parts by weight of n-propane was charged into the reactor and the polymerization of ethylene was carried out at 100° C. and 20,000 p.s.i. pressure. The resulting ethylene homopolymer embodying this invention exhibited a melt index of 1.05, an inherent viscosity of 0.95, a density of 0.941 and a stiffness of 46,000 p.s.i. As can be seen, this polymer had a density (and correspondingly a crystallinity) much greater than it was possible to achieve heretofore by high pressure polymerization. The density of the polymer puts it in the range of what have become known as "high density" polyethylene. The stiffness was increased more than two-fold whereas the melt index and inherent viscosity remained in a workable range whereby the polymer showed excellent molding characteristics to give relatively rigid molded articles having an excellent mold finish.

*Example 3*

The concentration of the aliphatic hydrocarbon can be varied as herein defined within the range of from 5 to 50% by weight based on the weight of the ethylene being polymerized. Thus, 0.008 part by weight of diethyl 2,2'-azobis-(2-methyl propionate) in 21.2 parts by weight of n-propane was used to polymerize ethylene at 100° C. and 20,000 p.s.i. pressure according to the process previously described. The resulting ethylene homopolymer had a melt index of 9.9–10.6, an inherent viscosity of 0.79, a density of 0.947 and a stiffness of 52,000 p.s.i.

*Example 4*

As has been indicated, any of the straight or branched chain saturated acyclic aliphatic hydrocarbons containing 3–7 carbon atoms can be used in practicing the invention. Thus, n-propane is conveniently employed, although such materials as n-butane, isobutane, pentane, isopentane, hexane and heptane can be used with good results. Thus, 0.008 part by weight of diethyl 2,2'-azobis-(2-methyl propionate) in 20 parts by volume in isobutane was used to polymerize ethylene in the 100 volume autoclave at 100° C. and 20,000 p.s.i. ethylene pressure. The resulting polyethylene had a melt index of 3.0, an inherent viscosity of 0.91, a density of 0.942 and a stiffness of 43,000 p.s.i.

*Example 5*

The best results are obtained in accordance with this invention using at least 10–15% by weight of the hydrocarbon based on the ethylene being polymerized with particularly good results being achieved when the hydrocarbon amounts to more than 15% but not more than 50% of the ethylene. Also, for some reason which is not apparent, the azo catalysts generally give somewhat higher densities than do the organic peroxides. To illustrate, 0.004 part by weight of di-tert.-butyl peroxide in 16 parts by weight of n-propane was used to polymerize ethylene at 140° C. and 20,000 p.s.i. pressure. The resulting polymer had a melt index of 12.98 and a stiffness of 38,000 p.s.i. In practicing the invention, the improved stiffness results are best obtained by using a relatively higher concentration of the catalyst whereby a lower polymerization temperature can be employed. Thus, the process was repeated using 0.001 part by weight of di-tert.-butyl peroxide in 6.7 parts by weight of n-propane, and the ethylene was polymerized at 180° C. and 20,000 p.s.i. The resulting polymer had a melt index of but 0.28 and a stiffness of 23,000 p.s.i.

*Example 6*

When the amount of hydrocarbon was increased, much better results were obtained under the same conditions. Thus, 0.001 part by weight of di-tert.-butyl peroxide in 16.0 parts by weight of n-propane was used to polymerize ethylene as described at 180° C. and 20,000 p.s.i. pressure. The resulting polymer had a melt index of 220, a viscosity of 0.51, a density of 0.931 and a stiffness of 43,000 p.s.i.

Example 7

Ethylene was polymerized at 100° C. and 20,000 p.s.i. ethylene pressure by means of .008 part by weight of diethyl 2,2'-azobis-(2-methyl propionate) in 10.6 parts by weight of n-propane in the 100 volume autoclave. The resulting homopolymer had a melt index of 0.007, an inherent viscosity of 1.35, a density of 0.937 and a stiffness of 26,000 p.s.i.

Example 8

Ethylene was polymerized according to the process described at 140° C. and 20,000 p.s.i. pressure in the presence of 0.004 part by weight of di-tert.-butyl peroxide in 25 parts by volume of n-heptane. The polymer thus obtained exhibited the exceptionally high density of 0.945 and had an inherent viscosity of 0.79.

Example 9

A mixture of 0.008 part by weight of diethyl 2,2'-azobis-(2-methyl propionate) in 20 parts by volume of n-hexane was used to polymerize ethylene at 100° C. and 20,000 p.s.i. pressure. The resulting solid homopolymer had a density of 0.944, an inherent viscosity of 0.80, a melt index of 11.3 and a stiffness of 64,000 p.s.i. These results are in sharp contrast to the polymerization of ethylene at 150° C. and 15,000 p.s.i. using 0.009 part by weight of di-tert.-butyl peroxide in the absence of a hydrocarbon solvent. The resulting polymer had a viscosity of 1.60 and a stiffness of only 20,000 p.s.i.

Thus by means of this invention ethylene homopolymer is readily obtained exhibiting greatly improved density (and correspondingly increased crystallinity), much higher heat distortion temperatures than conventional polyethylene (the heat distortion temperatures of the products described hereinabove being in the range of 110–130° C.), and much greater stiffness and tensile strength than was obtainable heretofore by high pressure polymerization. The process of the invention is readily effected in equipment presently available for commercial manufacture, and the known techniques for commercial manufacture are applicable. The greatly changed characteristics of the polyethylene obtained by means of this invention markedly widens the field of use of high pressure polyethylene. Thus, although the art had employed hydrocarbons in high pressure polymerization under different concentration conditions and different temperature and pressure conditions, the results obtained by means of this invention were quite unexpected since the art had indicated that hydrocarbons ordinarily give liquid products or low molecular weight products of extremely low softening temperature. In contrast to this, the present invention provides a method of commercially manufacturing polyethylene having the greatly improved characteristics which were obtainable heretofore only in low pressure processes using pyrophoric catalysts or solid bed catalysts containing metallic constituents which deleteriously affected the stability and color of the product unless special techniques were employed for ensuring removal of the metallic catalyst.

Although the invention has been described in detail with reference to certain preferred embodiments thereof, it will be understood that variations and modifications can be effected within the spirit and scope of the invention as described hereinabove and as defined in the appended claims.

We claim:

1. The method which comprises polymerizing ethylene to solid polymer having a density substantially higher than obtained under the same conditions but in the absence of paraffinic hydrocarbon, said method comprising polymerizing ethylene at a pressure of 15,000–30,000 p.s.i. and a temperature of 80–180° C. in the presence of an ethylene polymerization catalyst selected from the group consisting of organic peroxides and azo compounds and in the presence of from 5–50% by weight based on the weight of said ethylene of a paraffinic hydrocarbon of the group consisting of n-propane, isobutane, n-hexane and n-heptane, and in the absence of any other diluent or solvent.

2. The method according to claim 1 wherein the polymerization catalyst is diethyl 2,2'-azobis-(2-methyl propionate) and the hydrocarbon is n-propane.

3. The method according to claim 1 wherein the polymerization catalyst is di-tert.-butyl peroxide and the hydrocarbon is n-propane.

4. The method according to claim 1 wherein the polymerization catalyst is diethyl 2,2'-azobis-(2-methyl propionate) and the hydrocarbon is isobutane.

5. The method according to claim 1 wherein the polymerization catalyst is diethyl 2,2'-azobis-(2-methyl propionate) and the hydrocarbon is n-hexane.

6. The method according to claim 1 wherein the polymerization catalyst is di-tert.-butyl peroxide and the hydrocarbon is n-heptane.

7. The method of polymerizing ethylene to form an improved solid ethylene homopolymer having an average molecular weight in the range of 20,000–200,000, a density above 0.930, a stiffness above 25,000 p.s.i., a heat distortion temperature in the range of 110–130° C. and an inherent viscosity in the range of 0.5 to 1.5 deciliters per gram in tetralin at 100° C. which comprises polymerizing ethylene at a pressure of about 20,000 p.s.i. and a temperature of 100–180° C. in the presence of from 10 to 100 parts per million parts of ethylene of an ethylene polymerization catalyst selected from the group consisting of organic peroxides and azo compounds and in the presence of from 5 to 50% by weight based on said ethylene of n-propane and in the absence of any other solvent or diluent.

8. The method of polymerizing ethylene to form an improved solid ethylene homopolymer having an average molecular weight in the range of 20,000–200,000, a density above 0.930, a stiffness above 25,000 p.s.i., a heat distortion temperature in the range of 110–130° C. and an inherent viscosity in the range of 0.5 to 1.5 deciliters per gram in tetralin at 100° C. which comprises polymerizing ethylene at a pressure of about 20,000 p.s.i. and a temperature of 100–180° C. in the presence of from 10 to 100 parts per million parts of ethylene of an ethylene polymerization catalyst selected from the group consisting of organic peroxides and azo compounds and in the presence of from 5 to 50% by weight based on said ethylene of isobutane and in the absence of any other solvent or diluent.

9. The method of polymerizing ethylene to form an improved solid ethylene homopolymer having an average molecular weight in the range of 20,000–200,000, a density above 0.930, a stiffness above 25,000 p.s.i., a heat distortion temperature in the range of 110–130° C. and an inherent viscosity in the range of 0.5 to 1.5 deciliters per gram in tetralin at 100° C. which comprises polymerizing ethylene at a pressure of about 20,000 p.s.i. and a temperature of 100–180° C. in the presence of from 10 to 100 parts per million parts of ethylene of an ethylene polymerization catalyst selected from the group consisting of organic peroxides and azo compounds and in the presence of from 5 to 50% by weight based on said ethylene of n-heptane and in the absence of any other solvent or diluent.

10. The method of polymerizing ethylene to form an improved solid ethylene homopolymer having an average molecular weight in the range of 20,000–200,000, a density above 0.930, a stiffness above 25,000 p.s.i., a heat distortion temperature in the range of 110–130° C. and an inherent viscosity in the range of 0.5 to 1.5 deciliters per gram in tetralin at 100° C. which comprises polymerizing ethylene at a pressure of about 20,000 p.s.i.

and a temperature of 100–180° C. in the presence of from 10 to 100 parts per million parts of ethylene of an ethylene polymerization catalyst selected from the group consisting of organic peroxides and azo compounds and in the presence of from 5 to 50% by weight based on said ethylene of n-hexane and in the absence of any other solvent or diluent.

References Cited in the file of this patent

UNITED STATES PATENTS

| | | |
|---|---|---|
| 2,568,902 | Thompson | Sept. 25, 1951 |
| 2,691,647 | Field | Oct. 12, 1954 |
| 2,692,261 | Peters | Oct. 19, 1954 |
| 2,767,160 | Field | Oct. 16, 1956 |
| 2,816,833 | Larchar et al. | Dec. 17, 1957 |
| 2,820,779 | Dale | Jan. 21, 1958 |

FOREIGN PATENTS

| | | |
|---|---|---|
| 502,597 | Canada | May 18, 1954 |